United States Patent [19]
Gröbel et al.

[11] Patent Number: 6,165,231
[45] Date of Patent: Dec. 26, 2000

[54] DYE MIXTURE, PROCESS FOR IT'S PREPARATION AND USE THEREOF

[75] Inventors: Bengt-Thomas Gröbel, Waldems; Christian Schumacher, Kelkheim; Mieke Schaffeld, Bad Camberg; Karl Krieger, Hünstetten, all of Germany; Dierk Röhrig, Jakarta, Indonesia

[73] Assignee: Dystar Textilfarben GmbH & Co. Deutschland KG, Frankfurt am Main, Germany

[21] Appl. No.: 09/436,548

[22] Filed: Nov. 9, 1999

[30] Foreign Application Priority Data

Nov. 11, 1998 [DE] Germany ............... 198 52 051

[51] Int. Cl.$^7$ ............... C09B 67/24; D06P 1/382; D06P 1/384
[52] U.S. Cl. ............... 8/549; 8/641; 8/918
[58] Field of Search ............... 8/549, 641, 918

[56] References Cited

U.S. PATENT DOCUMENTS

| | | |
|---|---|---|
| 4,588,411 | 5/1986 | Scheibli et al. . |
| 4,647,285 | 3/1987 | Scheibli et al. . |
| 4,725,675 | 2/1988 | Meininger et al. . |
| 5,131,917 | 7/1992 | Miyamoto et al. . |
| 5,308,392 | 5/1994 | Kayane et al. . |
| 5,980,590 | 11/1999 | Russ et al. . |

FOREIGN PATENT DOCUMENTS 58-55189  5/1982  Japan .

*Primary Examiner*—Margaret Einsmann
*Attorney, Agent, or Firm*—Connolly Bove Lodge & Hutz LLP

[57] ABSTRACT

Described are dye mixtures comprising dyes containing a coupling component comprising a 1-(chlorotriazinyl)amino-3,6-disulfo-8-naphthol radical, the dye or dyes of the one group of dyes containing an optionally loweralkyl-, loweralkoxy-, halogen, sulfo- and/or carboxy-substituted phenylamino or naphthylamino radical attached to the chlorotriazine radical and possessing a diazo component comprising an optionally loweralkyl-, loweralkoxy-, sulfo- and/or carboxy-substituted phenyl radical which is substituted by a fiber-reactive group of the vinyl sulfone series, and the dye or dyes of the other group of dyes containing attached to the chlorotriazine radical a phenylamino radical whose phenyl is substituted by a fiber-reactive group of the vinyl sulfone series and may be substituted by lower alkyl, lower alkoxy, sulfo and/or carboxy, and possessing a diazo component comprising a radical of benzene or naphthalene which may in each case be optionally substituted by lower alkyl, lower alkoxy, halogen, sulfo and/Qr carboxy. The dye mixtures are useful for preparing a dyeings and prints on hydroxy and/or carboxamido-containing fiber material, for example cotton and viscose fibers, and also wool and synthetic polyamide fiber materials and afford strong fast dyeings having a red hue.

15 Claims, No Drawings

DYE MIXTURE, PROCESS FOR IT'S PREPARATION AND USE THEREOF

This invention relates to the technical field of fiber-reactive azo dyes.

Dyes conforming to the hereinbelow indicated and defined general formulae (1) and (2) have certain application defects, for example an excessive dependence of the color yield on changing dyeing parameters in the dye process, an insufficient solubility in the aqueous dyebath at higher dye concentrations in the presence of electrolyte salts or an insufficient color build-up on cotton and especially viscose (good color build-up follows from the ability of a dye to produce a correspondingly stronger dyeing from an increased dye concentration in the dyebath). Possible consequences of these shortcomings are poor reproducibility for the dyeings which are obtainable. However, it is particularly important to obtain dyeings having a good color yield, i.e., dyeings whose depth of shade is very high in relation to the amount of dye used, for example in comparison with other dyes, because of the coloring property of the dye itself (high extinction) and because of the dyeing characteristics of this dye, such as good affinity and a high yield of fixation. If mixtures of dyes having a certain color yield are used, the color yield of this mixture of dyes will generally be the average of the color yields of the individual dyes, which is why the color yield of a mixture of, for example, two dyes will be less than the color yield obtained when the dye having the larger color yield property is used as the only dye and in the total amount of the two individual dyes.

The present invention, then, provides mixtures of azo dyes conforming to the hereinbelow defined general formulae (1) and (2)

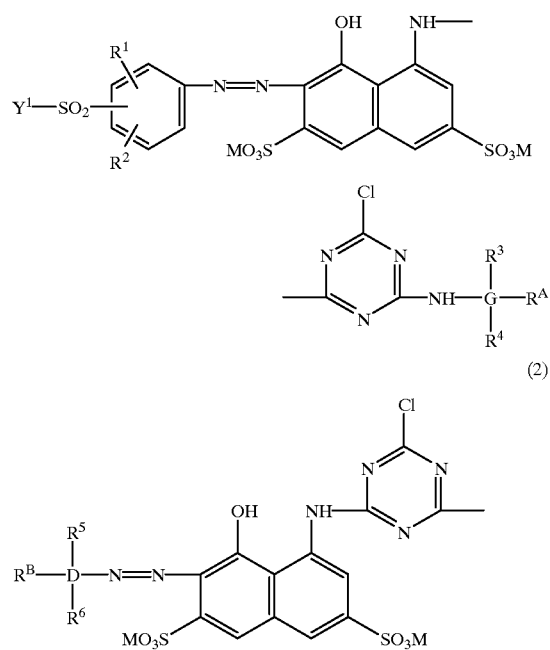

-continued

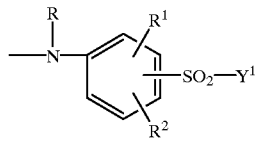

whose color strength is surprisingly higher than the sum total of the other strengths provided by the individual dyes of the dye mixture. This synergistic effect also shows itself in improved build-up characteristics on the part of the mixture of the invention, compared with the individual dyes in the mixture when dyeing hydroxy- and carboxamido-containing fiber materials, for example cellulose fiber materials, such as cotton, and especially in the case of viscose fiber materials.

The invention thus provides dye mixtures comprising one or more, such as two or three, preferably 1 or 2, dyes of the general formula (1) and one or more, such as two or three, preferably 1 or 2, dyes of the general formula (2) in a molar ratio of the dye or dyes (1) and the dye or dyes (2) of 70:30 to 30:70, preferably 60:40 to 40 60.

In these formulae:

M is hydrogen, an alkali metal, such as sodium, potassium or lithium, or the equivalent of an alkaline earth metal, as of calcium, preferably hydrogen and especially sodium, potassium or lithium;

$R^1$ is hydrogen, alkyl of 1 to 4 carbon atoms, such as ethyl and especially methyl, alkoxy of 1 to 4 carbon atoms, such as ethoxy and especially methoxy, sulfo or carboxy, preferably hydrogen, methyl and methoxy and particularly preferably hydrogen;

$R^2$ is hydrogen, alkyl of 1 to 4 carbon atoms, such as ethyl and especially methyl, or alkoxy of 1 to 4 carbon atoms, such as ethoxy and especially methoxy, preferably hydrogen, methyl and methoxy and particularly preferably hydrogen;

G is a radical of benzene or of naphthalene;

$R^3$ when G is a radical of benzene is hydrogen, alkyl of 1 to 4 carbon atoms, such as ethyl and especially methyl, alkoxy of 1 to 4 carbon atoms, such as ethoxy, and especially methoxy, halogen, such as bromine or chlorine, sulfo or carboxy, preferably hydrogen, methyl, methoxy and sulfo, particularly preferably sulfo, and is hydrogen, methyl, sulfo or carboxy, preferably sulfo, when G is a radical of naphthalene;

$R^4$ when G is a radical of benzene is hydrogen, alkyl of 1 to 4 carbon atoms, such as ethyl and especially methyl, alkoxy of 1 to 4 carbon atoms, such as ethoxy and especially methoxy, or sulfo, especially hydrogen, methyl, methoxy and sulfo, particularly preferably hydrogen and sulfo, and is hydrogen or sulfo when G is a radical of naphthalene;

$R^A$ is hydrogen or sulfo, preferably hydrogen;

D is a radical of benzene or of naphthalene;

$R^5$ when D is a radical of benzene is hydrogen, alkyl of 1 to 4 carbon atoms, such as ethyl and especially methyl, alkoxy of 1 to 4 carbon atoms, such as ethoxy and especially methoxy, halogen, such as bromine and chlorine, sulfo or carboxy, preferably hydrogen, methyl, methoxy and sulfo, particularly preferably sulfo, and is hydrogen, methyl, sulfo or carboxy, preferably sulfo, when D is a radical of naphthalene;

$R^6$ when D is a radical of benzene is hydrogen, alkyl of 1 to 4 carbon atoms, such as ethyl and especially methyl, alkoxy of 1 to 4 carbon atoms, such as ethoxy and especially methoxy, or sulfo, preferably hydrogen, methyl, methoxy and sulfo, particularly preferably hydrogen and sulfo, and is hydrogen or sulfo when D is a radical of naphthalene;

$R^B$ is hydrogen or sulfo, preferably hydrogen;

$R^7$ is hydrogen, alkyl of 1 to 4 carbon atoms, such as ethyl and especially methyl, alkoxy of 1 to 4 carbon atoms, such as ethoxy and especially methoxy, sulfo or carboxy, preferably hydrogen, methyl and methoxy and particularly preferably hydrogen;

$R^8$ is hydrogen, alkyl of 1 to 4 carbon atoms, such as ethyl and especially methyl, or alkoxy of 1 to 4 carbon atoms, such as ethoxy and especially methoxy, preferably hydrogen, methyl and methoxy and particularly preferably hydrogen;

R is hydrogen or alkyl of 1 to 4 carbon atoms, such as methyl or ethyl, preferably hydrogen;

$Y^1$ is vinyl or is ethyl which is substituted in the β-position by an alkali-eliminable substituent, for example by chlorine, sulfato, thiosulfato, phosphate, alkanoyloxy of 2 to 5 carbon atoms, such as acetyloxy, and sulfobenzoyloxy, and is preferably vinyl, β-chloroethyl and β-sulfatoethyl and particularly preferably vinyl and β-sulfatoethyl;

$Y^2$ has any of the meanings of $Y^1$, 1 2 the $Y^1$—$SO_2$— and —$SO_2$—$Y^2$ groups are preferably attached to the benzene nucleus in a position meta or para to the azo group and to the amino group, respectively.

Hereinbelow the dyes of the general formulae (1) may be referred to globally as "dyes (1)" and the dyes (2) as "dyes (2)". They are known from European Patent Application Publication No. 0 032 187 and from Japanese Patent Application Publication Sho-58-189, or can be prepared similarly to the procedures described therein.

In the above general formulae and also in the subsequent general formulae, the individual constituents of the formulae, whether they bear identical or different designations, can have meanings under their definition which are mutually identical or different.

The terms "sulfo", "thiosulfato", "carboxy", "phosphate" and "sulfato" cover not only the acid form but also the salt form of the respective groups. Accordingly, sulfo groups are groups conforming to the general formula —$SO_3M$, thiosulfato groups are groups conforming the general formula —S—$SO_3M$, carboxy groups are groups conforming to the general formula —COOM, phosphato groups are groups conforming to the general formula —$OPO_3M_2$ and sulfato groups are groups conforming to the general formula —$OSO_3M$, in which M is as defined above.

Groups of the general formulae (3a) and (3b)

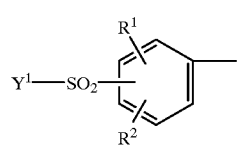
(3a)

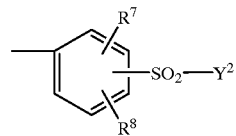
(3b)

which are present in the dyes (1) and dyes (2), respectively, are for example 3-(β-sulfatoethylsulfonyl)phenyl, 4-(β-sulfatoethylsulfonyl)phenyl, 2-methyl-5-(β-sulfatoethylsulfonyl)phenyl, 2-methoxy-5-(β-sulfatoethylsulfonyl)phenyl, 4-methyl-3-(β-sulfatoethylsulfonyl)phenyl, 2,5-dimethyl-4-(β-sulfatoethylsulfonyl)phenyl, 2,6-dimethyl-4-(β-sulfatoethylsulfonyl)phenyl, 2-methoxy4-(β-sulfatoethylsulfonyl)phenyl, 4-methoxy-5-(β-sulfatoethylsulfonyl)phenyl, 2-methoxy-5-methyl-4-(β-sulfato-ethylsulfonyl)phenyl, 2,4-dimethoxy-5-(1-sulfatoethylsulfonyl)phenyl, 2,5-dimethoxy- 4-(β-sulfatoethylsulfonyl)phenyl, 2-carboxy-5-(β-sulfato-ethylsulfonyl)phenyl, 2-sulfo-5-(β-sulfatoethylsulfonyl) phenyl and 2-sulfo4-(β-sulfatoethylsulfonyl)phenyl, especially 3- or 4-(β-sulfatoethylsulfonyl)phenyl, and also derivatives thereof in which the β-sulfatoethylsulfonyl group is replaced by the vinylsulfonyl or β-thiosulfatoethylsulfonyl or β-chloroethylsulfonyl group.

Groups conforming to the general formulae —$G(R^3, R^4, R^A)$ and $(R^B, R^5, R^6)$—D—, which are present in the dyes (1) and dyes (2), respectively, are for example 2-sulfophenyl, 3-sulfophenyl, 4-sulfophenyl, 2-sulfo-4-methoxyphenyl, 2-sulfo-4-methylphenyl, 2,5-disulfo4-methoxyphenyl, 2,5-disulfo4-methylphenyl, 2,5-disulfophenyl, 2,4-disulfophenyl, 2-carboxy-phenyl, 1-sulfonaphth-2-yl, 1,5-disulfonaphth-2-yl, 4,8-disulfonaphth-2-yl and 5,7-disulfonaphth-2-yl.

Among the dye mixtures of the invention, preference is given to those comprising dyes (1) where $Y^1$—$SO_2$— is vinyl and particularly preferably β-sulfatoethylsulfonyl and is attached to the phenyl radical in a position para to the azo group, $R^1$ and $R^2$ are both hydrogen and —$G(R^3, R^4, R^A)$ is 2-sulfophenyl, 3-sulfophenyl, 4-sulfophenyl or 1-sulfonaphth-2-yl, Among the dye mixtures of the invention, preference is likewise given to those which comprise dyes (2) where $(R^B, R^5, R^6)$—D— is 1,5-disulfonaphth-2-yl, 1-sulfonaphth-2-yl, 2-sulfophenyl or 2-sulfo-4-methyl and the group of the general formula (3b) is 3- or 4-vinylsulfonylphenyl or preferably 3- or 4-(β-sulfatoethylsulfonyl)phenyl, and also those which comprise such dyes (2) in which the diazo component $(R^B, R^5, R^6)$—D— is 2-sulfophenyl, R is ethyl and the group of the general formula (3b) is 3-vinylsulfonylphenyl or preferably 3-(β-sulfatoethylsulfonyl)phenyl, and further to dye mixtures of the invention comprising such dyes (2) in which the diazo component is 1,5-disulfonaphth-2-yl, R is hydrogen and the group of the general formula (3b) is 2-methoxy-5-vinylsulfonylphenyl or preferably 2-methoxy-5-(β-sulfatoethylsulfonyl)phenyl.

The dyes of the general formula (1) may, especially in the case of the same chromophore, have different fiber-reactive groups —$SO_2$—$Y^1$ within the definition of $Y^1$ (the same is true with regard to $Y^2$ for the dyes of the general formula (2)). More particularly, the dye mixtures may contain dyes of the same chromophore conforming to the hereinmentioned general formulae where the fiber-reactive groups —$SO_2$—$Y^1$ and —$SO_2$—$Y^2$ are, on the one hand, vinylsulfonyl groups and, on the other, β-chloroethylsulfonyl or β-thiosulfatoethylsulfonyl or preferably β-sulfatoethylsulfonyl groups. When the dye mixtures include the respective dye components partly as dyes having a vinylsulfonyl group, then the fraction of the respective dye which has the vinylsulfonyl group is up to about 30 mol %, based on the respective dye chromophore.

The dye mixtures of the invention are preparable in a conventional manner, for example by mechanically mixing the individual dyes, whether in the form of their dye powders or granules or their as-synthesized solutions or in the form of aqueous solutions of the individual dyes in general, which may further include customary auxiliaries.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium borate, sodium bicarbonate, sodium dihydrogenphosphate and disodium hydrogenphosphate and small amounts of siccatives, or, if they are present in a liquid, aqueous solution (including the presence of thickeners of the type customary in print pastes), also substances which ensure a long life for these preparations, for example mold preventatives.

In general, the dye mixtures of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 5% by weight, based on the dye powder. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, preferably up to 2% by weight.

The separation from their synthesis solution of the chemically prepared dye mixtures of the invention can be effected according to generally known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention have useful application properties. They are used for dyeing or printing hydroxy- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions obtained in the synthesis of the azo compounds after mixing them to form the dye mixtures of the invention, if desired after or during addition of a buffer substance, and also if desired after concentrating or diluting, can be used directly as liquid preparation for dyeing.

The present invention thus also relates to the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxy-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good color yields which are improved compared with the individual dyes. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the batch after the actual dyeing temperature has been reached.

The padding processes likewise provide excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried a out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish a(cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fiber materials, in bright yellowish to bluish red shades.

The Examples hereinbelow serve to illustrate the invention. Parts and percentages are by weight, unless otherwise stated. Parts by weight relate to parts by volume as the kilogram relates to the liter. The compounds described in the Examples in terms of a formula are in the form of free acids; in general they are prepared and isolated in the form of their salts, preferably sodium or potassium salts, and used for dyeing in the form of their salts. The starting compounds mentioned in the following Examples, especially Table Examples, can similarly be used in the synthesis in the form of the free acid or in the form of their salts, preferably alkali metal salts, such as sodium or potassium salts.

EXAMPLE 1

1000 parts of an aqueous solution containing 164 parts of the hereinbelow indicated dye of the formula (A-1), such as a synthesis solution of this dye, and 1000 parts of an aqueous solution containing 175 parts of the hereinbelow indicated dye of the ormula (B-1), such as a synthesis solution of this dye

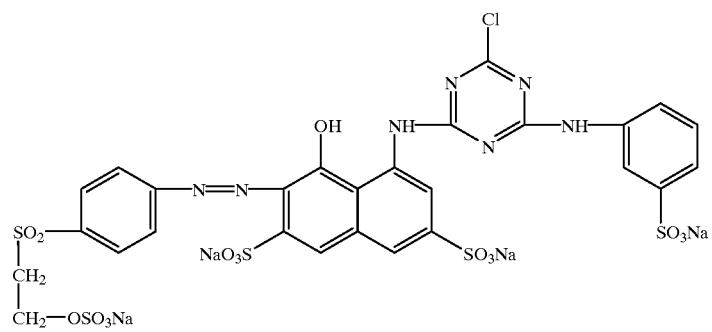

(A-1)

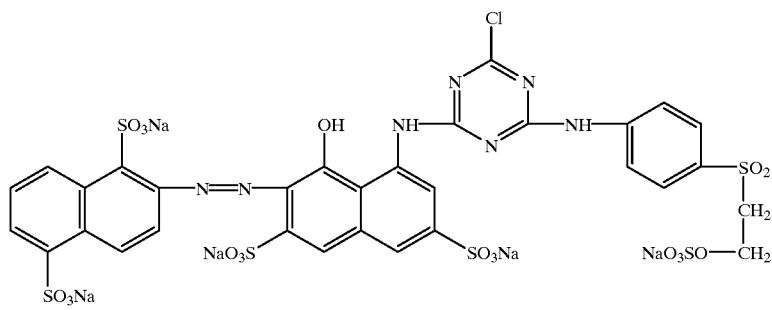

(B-1)

(where M is as defined above, preferably sodium) are mixed with each other.

The dye mixture of the invention is isolated from the combined solution in a molar mixing ratio of dye (A-1) to dye (B-1) of 50:50 in a conventional manner, for example by spray drying the dye solution. The resultant dye mixture of the invention which contains electrolyte salts from the synthesis, such as sodium chloride and sodium sulfate, has very good dyeing properties and provides for example on cellulosic fiber materials, such as cotton, or regenerated cellulose fibers, strong and level red dyeings when applied by an exhaust dyeing process customary for fiber-reactive dyes.

EXAMPLES 2 to 13

The Table Examples hereinbelow describe further inventive dye mixtures comprising dyes whose formulae (where M is as defined above) are indicated following the table. The mixtures possess very good application properties and provide on the materials mentioned in the description part, especially cellulose fiber materials, when applied by the dyeing and printing application methods customary in the art, preferably by the application and fixing methods customary in the art for fiber-reactive dyes, strong red dyings and prints having good fastness properties and a good color build-up. The numerical ratios reported in the MR column specify the molar mixing ratio of the two dyes to each other in mol %.

| Ex. | Dye (1) | Dye (2) | MR of (1):(2) |
|---|---|---|---|
| 2 | formula (A-1) | formula (B-2) | 60:40 |
| 3 | formula (A-1) | formula (B-3) | 50:50 |
| 4 | formula (A-1) | formula (B-4) | 40:60 |
| 5 | formula (A-1) | formula (B-5) | 60:40 |
| 6 | formula (A-2) | formula (B-6) | 65:35 |
| 7 | formula (A-3) | formula (B-7) | 50:50 |
| 8 | formula (A-4) | formula (B-8) | 45:55 |
| 9 | formula (A-1) | formula (B-9) | 53:47 |
| 10 | formula (A-5) | formula (B-1) | 50:50 |
| 11 | formula (A-1) | formula (B-10) | 50:50 |
| 12 | formula (A-1) | formula (B-11) | 49:51 |
| 13 | formula (A-1) | formula (B-12) | 48:52 |

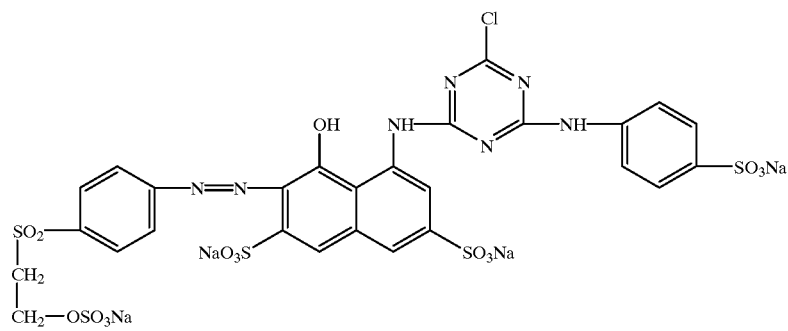

(A-2)

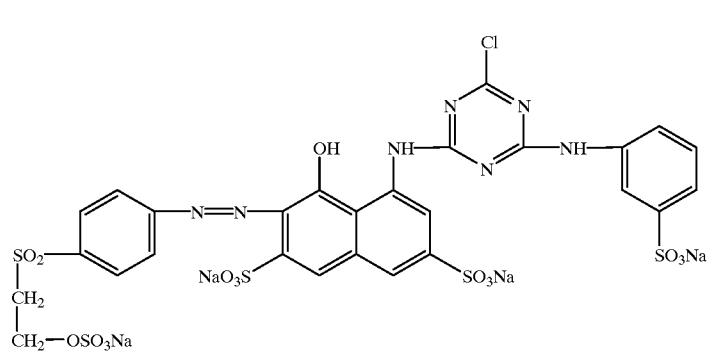

(A-3)

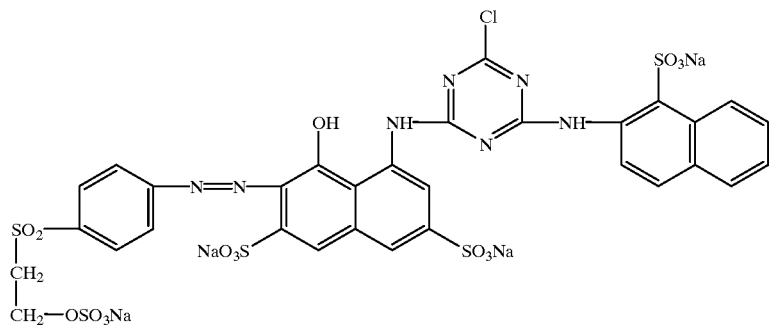
(A-4)
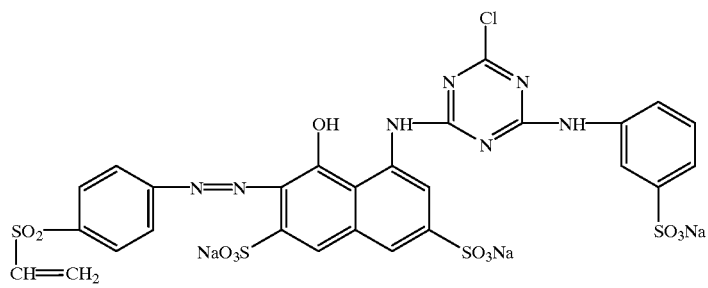
(A-5)
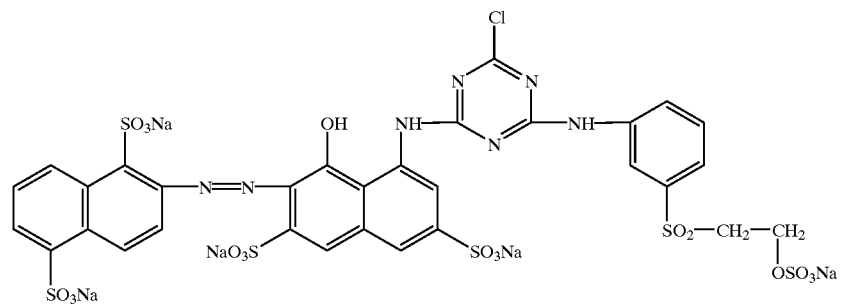
(B-2)
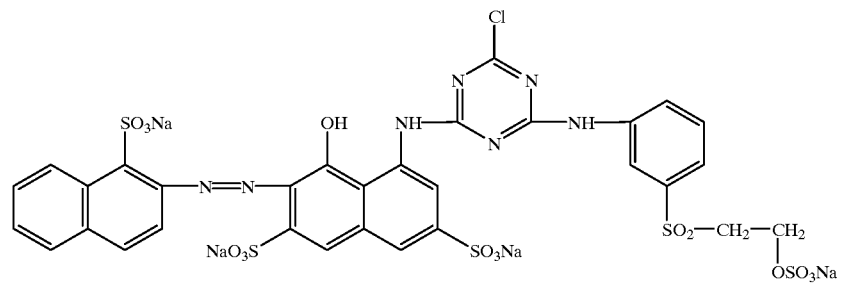
(B-3)
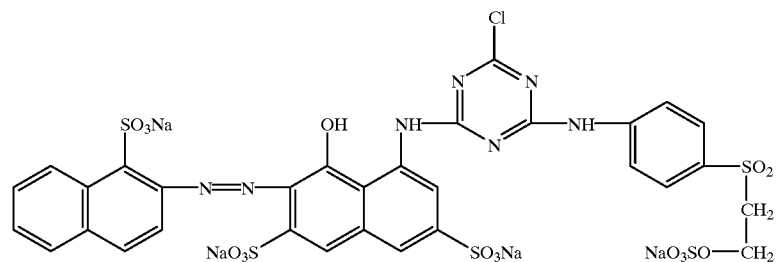
(B-4)

-continued
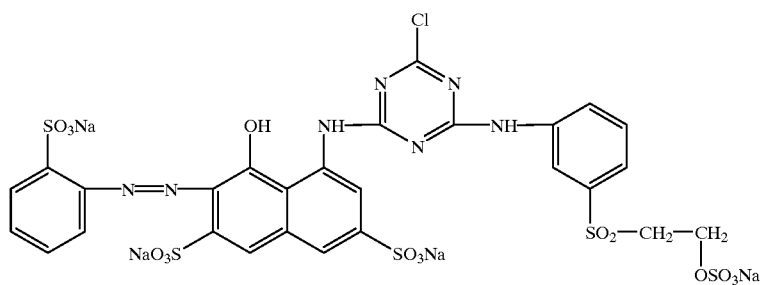
(B-5)
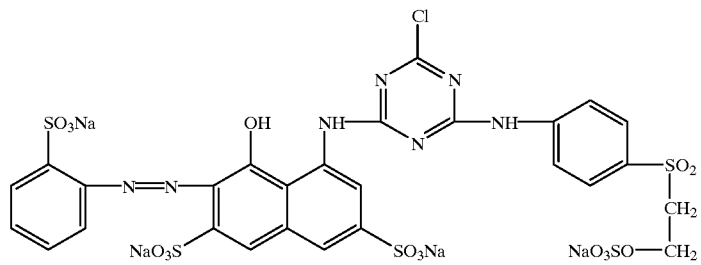
(B-6)
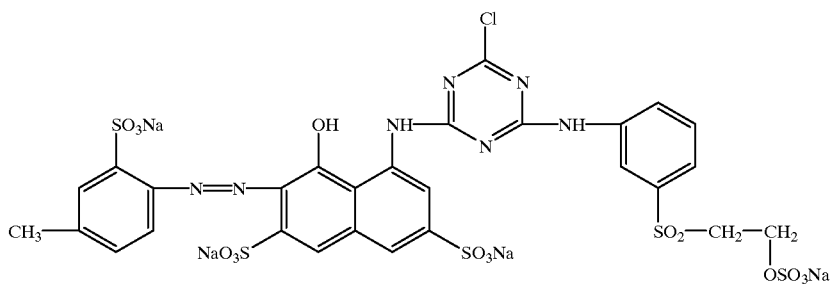
(B-7)
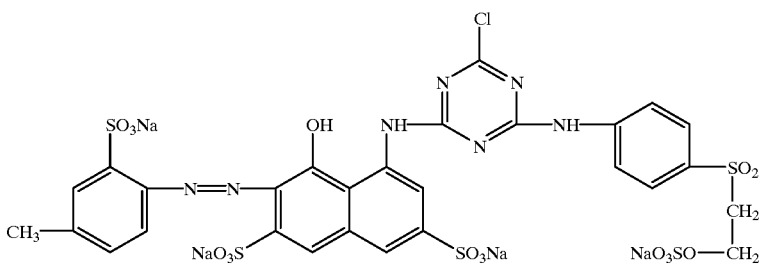
(B-8)
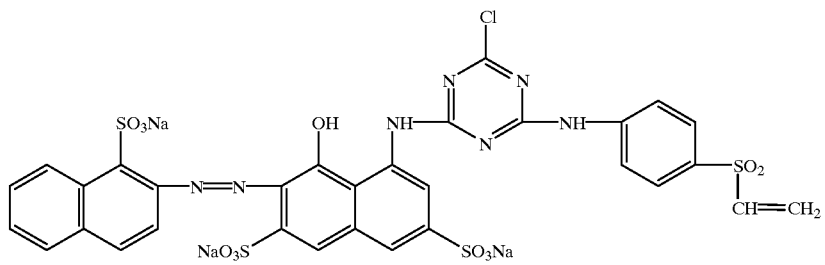
(B-9)

-continued
(B-10)
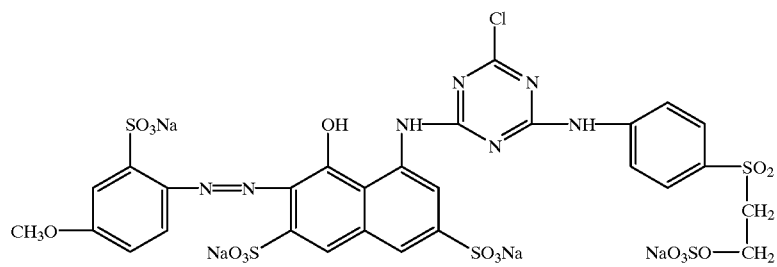
(B-11)
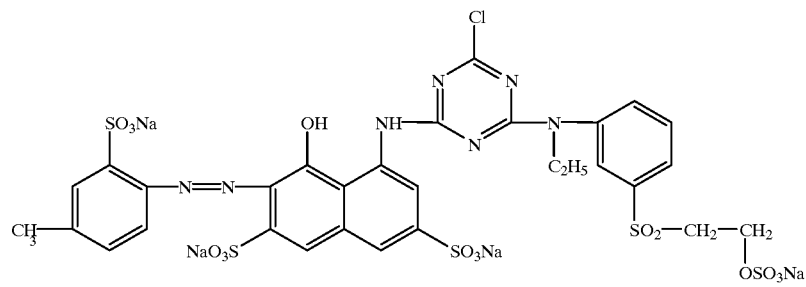
(B-12)
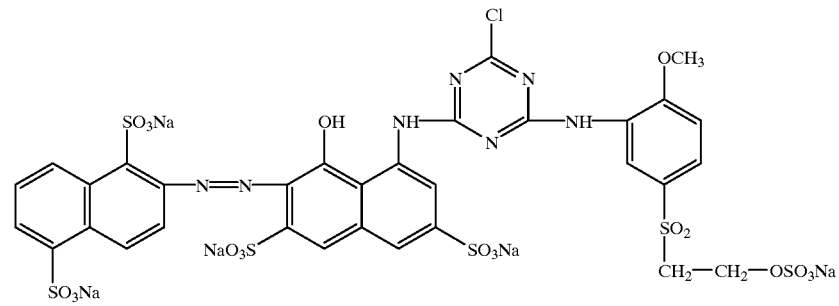
What is claimed is:
1. A dye mixture comprising one or more dyes of the general formula (1) and one or more dyes of the general formula (2) in a molar ratio of the dyes (1) and (2) of 70:30 to 30:70
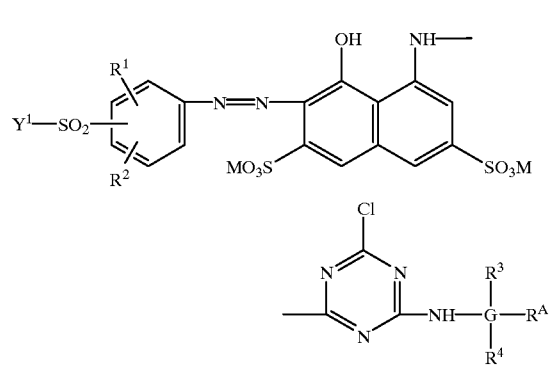
where:
M is hydrogen, an alkali metal or the equivalent of an alkaline earth metal;

$R^1$ is hydrogen, alkyl of 1 to 4 carbon atoms, alkoxy of 1 to 4 carbon atoms, sulfo or carboxy;

$R^2$ is hydrogen, alkyl of 1 to 4 carbon atoms or alkoxy of 1 to 4 carbon atoms;

G is a radical of benzene or naphthalene;

$R^3$ when G is a radical of benzene is hydrogen, alkyl of 1 to 4 carbon atoms, alkoxy of 1 to 4 carbon atoms, halogen, sulfo or carboxy, and is hydrogen, methyl, sulfo or carboxy when G is a radical of naphthalene;

$R^4$ when G is a radical of benzene is hydrogen, alkyl of 1 to 4 carbon atoms, alkoxy of 1 to 4 carbon atoms or sulfo and is hydrogen or sulfo when G is a radical of naphthalene;

$R^A$ is hydrogen or sulfo;

D is a radical of benzene or naphthalene;

$R^5$ when D is a radical of benzene is hydrogen, alkyl of 1 to 4 carbon atoms, alkoxy of 1 to 4 carbon atoms, halogen, sulfo or carboxy and is hydrogen, methyl, sulfo or carboxy, when D is a radical of naphthalene;

$R^6$ when D is a radical of benzene is hydrogen, alkyl of 1 to 4 carbon atoms, alkoxy of 1 to 4 carbon atoms or sulfo and is hydrogen or sulfo when D is a radical of naphthalene;

$R^B$ is hydrogen or sulfo;

$R^7$ is hydrogen, alkyl of 1 to 4 carbon atoms, alkoxy of 1 to 4 carbon atoms, sulfo or carboxy;

$R^8$ is hydrogen, alkyl of 1 to 4 carbon atoms or alkoxy of 1 to 4 carbon atoms;

R is hydrogen or alkyl of 1 to 4 carbon atoms;

$Y^1$ is vinyl or is ethyl which is substituted in the β-position by an alkali-eliminable substituent;

$Y^2$ has any of the meanings of $Y^1$.

2. A dye mixture as claimed in claim 1, wherein $R^1$ is hydrogen, methyl or methoxy.

3. A dye mixture as claimed in claim 1, wherein $R^2$ is hydrogen, methyl or methoxy.

4. A dye mixture as claimed in claim 1, wherein $R^1$ and $R^2$ are both hydrogen.

5. A dye mixture as claimed in claim 1, wherein $R^7$ is hydrogen, methyl or methoxy.

6. A dye mixture as claimed in claim 1, wherein $R^8$ is hydrogen, methyl or methoxy.

7. A dye mixture as claimed in claim 1, wherein $R^7$ and $R^8$ are both hydrogen.

8. A dye mixture as claimed in claim 1, wherein $R^3$ is hydrogen or sulfo, $R^4$ is sulfo and $R^A$ is hydrogen.

9. A dye mixture as claimed in claim 1, wherein $R^5$ is hydrogen or sulfo, $R^6$ is sulfo and $R^B$ is hydrogen.

10. A dye mixture as claimed in claim 1, wherein $Y^1$ is vinyl or β-sulfatoethyl.

11. A dye mixture as claimed in claim 1, wherein $Y^2$ is vinyl or β-sulfatoethyl.

12. A dye mixture as claimed in claim 1, wherein the $Y^1$—$SO_2$— group is attached to the benzene nucleus in a position meta or para to the azo group.

13. A dye mixture as claimed in claim 1, wherein the —$SO_2$—$Y^2$ group is attached to the benzene nucleus in a position meta or para to the amino group.

14. A dye mixture as claimed in claim 1, wherein R is hydrogen.

15. A dye mixture as claimed in claim 1, wherein the dye or dyes of the general formula (1) and the dye or dyes of the general formula (2) are present in a molar ratio of 60:40 to 40:60.

* * * * *

UNITED STATES PATENT AND TRADEMARK OFFICE
CERTIFICATE OF CORRECTION

PATENT NO. : 6,165,231
DATED : December 26, 2000
INVENTOR(S) : Bengt-Thomas Gröbel Page 1 of 1

It is certified that error appears in the above-identified patent and that said Letters Patent is hereby corrected as shown below:

Column 16,
Line 45 (claim 1, formula (2)), correct the formula to read as follows:

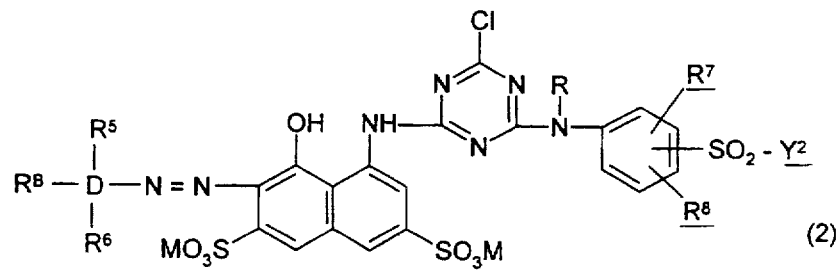

Signed and Sealed this

Thirtieth Day of October, 2001

Attest:

NICHOLAS P. GODICI
Attesting Officer     Acting Director of the United States Patent and Trademark Office